United States Patent
Schmitt et al.

(10) Patent No.: US 6,727,653 B2
(45) Date of Patent: Apr. 27, 2004

(54) SYSTEM FOR AUTOMATIC SWITCHING OF LIGHTING DEVICES IN VEHICLES

(75) Inventors: Patrick Schmitt, Lichtenau (DE); Norbert Hog, Buehl (DE); Bruno Hodapp, Achern-Oensbach (DE); Rainer Pientka, Renchen (DE); Hans Meier, Ottersweier (DE); Henry Blitzke, Buehl (DE); Manfred Burkart, Iffezheim (DE)

(73) Assignee: Robert Bosch GmbH, Stuttgart (DE)

( * ) Notice: Subject to any disclaimer, the term of this patent is extended or adjusted under 35 U.S.C. 154(b) by 102 days.

(21) Appl. No.: 09/979,501
(22) PCT Filed: Mar. 20, 2001
(86) PCT No.: PCT/DE01/01058
§ 371 (c)(1), (2), (4) Date: Mar. 4, 2002
(87) PCT Pub. No.: WO01/71389
PCT Pub. Date: Sep. 27, 2001

(65) Prior Publication Data
US 2002/0105415 A1 Aug. 8, 2002

(30) Foreign Application Priority Data
Mar. 23, 2000 (DE) .......................................... 100 14 549

(51) Int. Cl.$^7$ .............................................. H05B 37/00
(52) U.S. Cl. ........................................ 315/82; 307/10.8
(58) Field of Search .............................. 315/77, 82, 83; 307/10.8

(56) References Cited

U.S. PATENT DOCUMENTS 4,613,791 A * 9/1986 Kurihara et al. ............... 315/82

* cited by examiner

Primary Examiner—David Vu
(74) Attorney, Agent, or Firm—Ronald E. Greigg

(57) ABSTRACT

A sensor device, by which the light intensity in the surroundings of the vehicle is detected and which is connected to an evaluation device, by which the signals (S) of the sensor device for the light intensity are compared with at least one threshold value, and from that it is ascertained whether a change in the switching state of the lighting devices is necessary. The evaluation device evaluates signals (S) of the sensor device for the presence of at least one periodically variable signal component (Sk), and in the presence of such a signal component (Sk), the lighting devices are either turned on at a certain level, or remain turned on at that level. By this evaluation, light originating from artificial light sources and having a variable intensity depending on the alternating voltage with which these sources are operated, are detected and assure that the lighting devices will be turned on or will remain turned on if the vehicle is driving in a tunnel or underground garage, for instance, where lighting is provided by artificial light sources.

2 Claims, 2 Drawing Sheets

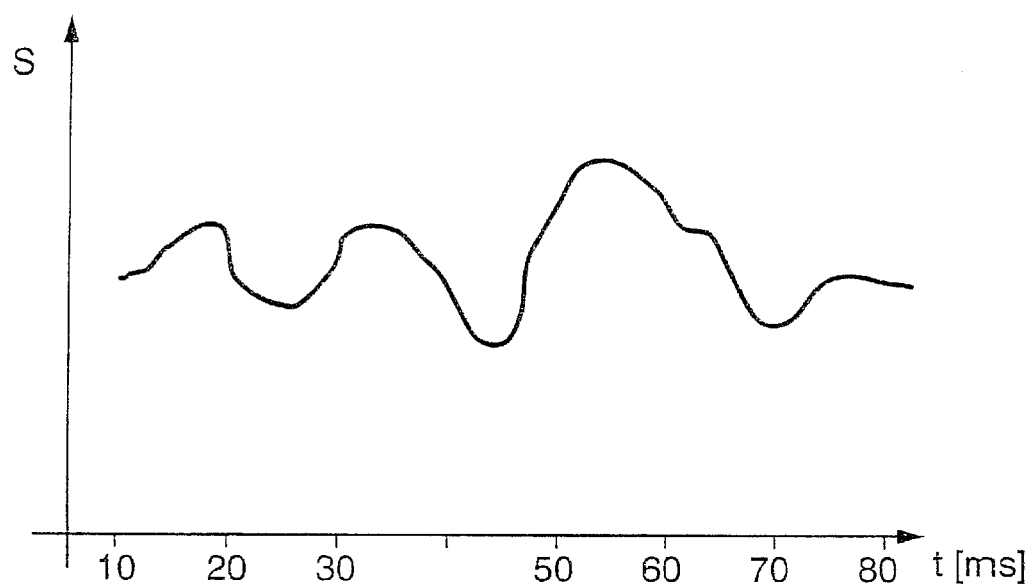
40 Fig. 3
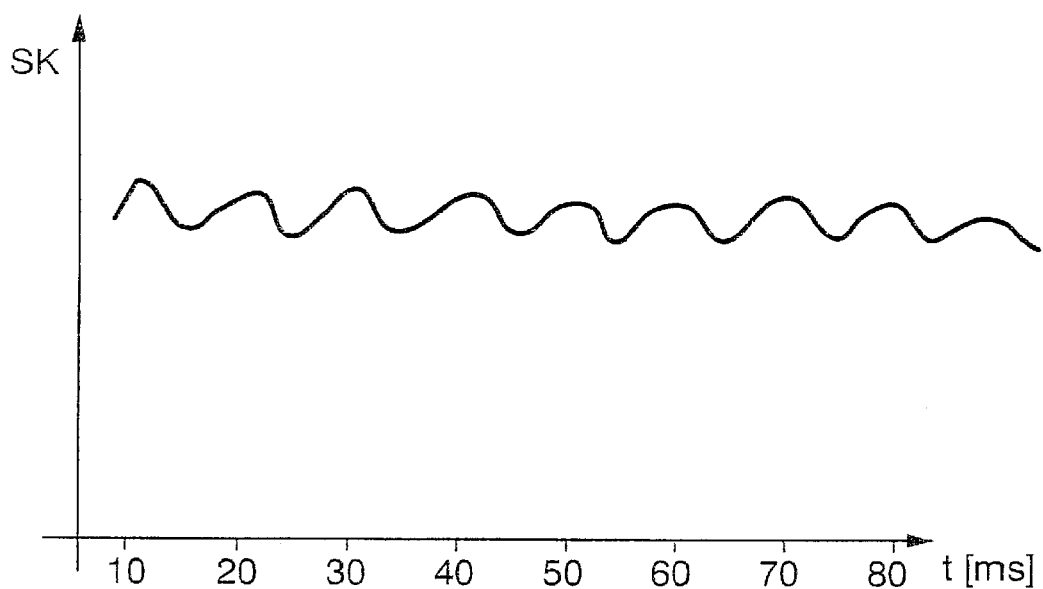
Fig. 4

SYSTEM FOR AUTOMATIC SWITCHING OF LIGHTING DEVICES IN VEHICLES

CROSS-REFERENCE TO RELATED APPLICATIONS

This application is a 35 USC 371 application of PCT/DE 01/01058 filed on Mar. 20, 2001.

BACKGROUND OF THE INVENTION

1. Field of the Invention

The invention is directed to a system for automatically switching lighting devices in vehicles.

2. Description of the Prior Art

One automatic light switching system, known from German Patent Disclosure DE 195 23 262 A1, has a sensor device, by which the light intensity in the surroundings of the vehicle is detected. The sensor device is connected to an evaluation device, by which the signals of the sensor device for the light intensity are compared with at least one threshold value and from that it is ascertained whether a change in the switching state of the lighting devices is necessary; that is, whether the lighting devices have to be switched on or can be switched off. In this known system, no distinction is made between light intensity originating from natural sunlight and light intensity originating from artificial light sources. For this reason, it can happen in the known system that the lighting devices of the vehicle are switched off or fail to be switched on when the vehicle is moving in a region of strong light intensity that originates in artificial light sources, as for instance in a tunnel or underground garage. In such areas, the lighting devices of the vehicle should, however, be switched on or remain switched on, which is not assured with the known-system.

SUMMARY OF THE INVENTION

The system of the invention has the advantage over the prior art that a distinction is made between the light intensity of a light component originating in natural sunlight and the light intensity of a light component originating in artificial light sources. This exploits the fact that artificial light sources are typically operated at alternating voltage, and thus as a function of the frequency of the alternating voltage, there are periodic changes in the intensity of the light emitted by the light sources, which reliably distinguish this light component from a light component originating in natural sunlight.

BRIEF DESCRIPTION OF THE DRAWINGS

One exemplary embodiment of the invention is described herein below, with reference to the drawings, in which:

FIG. 3 shows the course over time of the light intensity of a light component originating in sunlight; and FIG. 4 shows the course over time of the light intensity of a light component originating in artificial light source.

DESCRIPTION OF THE PREFERRED EMBODIMENT

Figure 1:
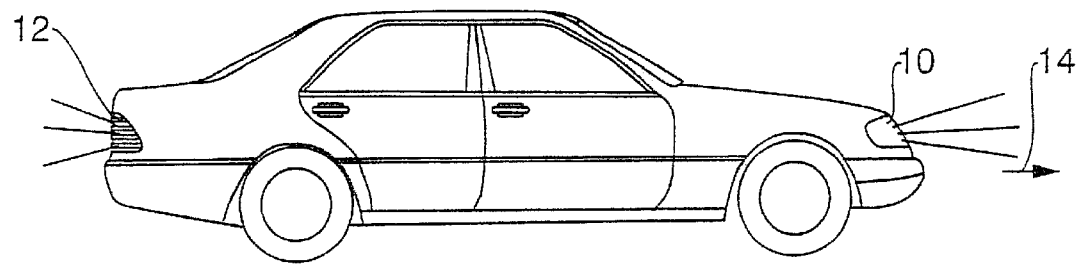
FIG. 1 shows a vehicle with lighting devices and with a system for automatically switching the lighting devices.

In FIG. 1 highly simplified, a vehicle and especially a motor vehicle is shown, which is provided with lighting devices, which include among others, headlights 10 disposed on the front of the vehicle and tail lights 12 disposed on the rear of the vehicle. The headlights 10 can be purely low-beam headlights or combined low- and high-beam headlights, which can be switched back and forth between their two operating positions. For automatically switching the lighting devices, that is, for the low-beam function of the headlights 10 and for the tail lights 12, a system disposed in the vehicle is provided.

Figure 2:
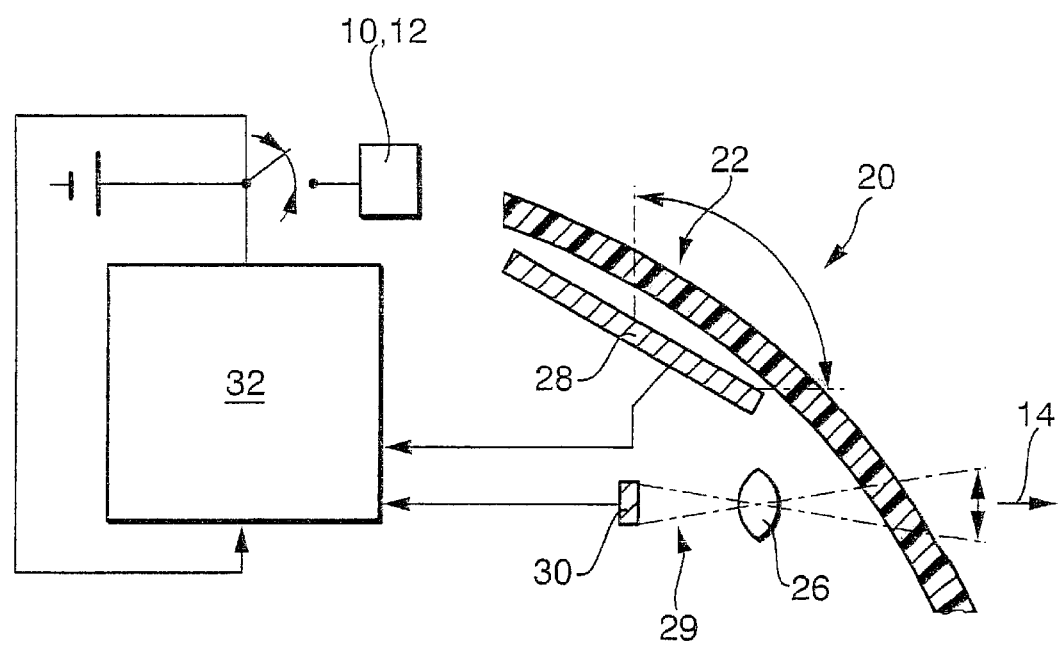
FIG. 2 schematically shows a light sensory system employed in FIG. 1.

This system, shown in simplified form in FIG. 2, has at least one sensor device 20, by which the light intensity in the surroundings of the vehicle is detected. The sensor device 20 can have two sensors 22, 29, the sensor 22 being a global sensor by which the light intensity in various directions in the surroundings of the vehicle is detected nondirectionally. The sensor 29 is a directional sensor, which detects only the light intensity of the light striking it from a certain direction. The directional sensor 29 is disposed such that it detects the light intensity of light striking it from opposite the travel direction 14 of the vehicle. The directional sensor 29 can have a projection lens system 26 by which light arriving opposite the travel direction 14 is focused onto the directional sensor 29. It is also possible for the sensor device 20 to have only a single sensor.

The global sensor 22 and the directional sensor 29 each have a respective light-sensitive element 28 and 30. The light-sensitive elements 28, 30 are photocells or photoresistors, for instance, or other elements in which as a function of the intensity of the light striking it, at least one electrical property changes. The change in the electrical property is a measure for the intensity of the light striking the elements 28, 30. The sensor device 20 can be disposed in the interior of the vehicle, for instance behind the windshield. Alternatively, the sensor device 20 can also be integrated into one of the headlights 10 or can be disposed at some other suitable point of the vehicle.

In addition to the sensor device 20, the system also has an electronic evaluation device 32, with which the sensor device 20 is connected. By means of the evaluation device 32, the signals of the sensor device 20 are compared with at least one threshold value, and the lighting devices 10, 12 are switched as a function thereof. If the signals of the sensor device 20 fall below a certain turn-on threshold value, then the evaluation device 32 causes the lighting devices 10, 12 to be switched on, or if the lighting devices 10, 12 are already on, it causes them to remain on. If the signals of the sensor device 20 exceed a certain turn-off threshold value, then the evaluation device 32 causes the lighting devices 10, 12 to be switched off. The turn-off threshold value is preferably higher than the turn-on threshold value, in order to prevent the lighting devices 10, 12 from being switched on and off in alternation when the signals of the sensor device 20 are fluctuating around the turn-on threshold value. The turn-on and turn-off threshold values can be either constant or variable, for instance as a function of operating parameters of the vehicle, such as its speed. The signals of the global sensor 22 and the directional sensor 29 of the sensor device 20 can be evaluated separately by the evaluation device 32, with different threshold values being made the basis for the signals of the global sensor 22 and the signals of the directional sensor 29. The lighting devices 10, 12 are made to be turned on only if the signals of both the global sensor 22 and the directional sensor 29 fall below the respective turn-on threshold values, and the lighting devices 10, 12 are switched off only if the signals of both the global sensor 22 and the directional sensor 29 exceed the respective turn-off threshold values.

In FIG. 3, by way of example, a course of a signal S of the sensor device 20 is plotted over the time t during the travel of the vehicle. In FIG. 3, the course of the signal S of the global sensor 22 is shown; for the signal of the directional sensor 29, a qualitatively similar course would result. The signal has irregular changes, caused for instance by the shadows cast by trees, buildings, bridges, or rises in the terrain or the like. As the intensity of sunlight decreases, for instance at twilight, this does not change this irregular course of the signal over time, but the overall level of the signal does decrease.

If the vehicle is moving inside a tunnel, underground garage, or parking garage, where there are artificial light sources that generate a high light intensity, the lighting devices 10, 12 of the vehicle should nevertheless be switched on and remain switched on. According to the invention, it is therefore provided that by means of the evaluation device, light intensity originating in artificial light sources is detected, and in this case despite what under some circumstances may be a light intensity above the turn-off threshold value, the lighting devices 10, 12 are made to be turned on, or the lighting devices 10, 12 if already on are kept on.

FIG. 4 by way of example shows a course of a signal Sk of the sensor device 20 plotted over the time t, representing the light intensity of the light emitted by artificial light sources that are operated with alternating voltage. The light intensity generated by artificial light sources has periodic fluctuations, which are caused by the alternating voltage and have the same frequency as the alternating voltage. Typically, the alternating voltage of the public utility grid has a frequency between about 20 Hz and 100 Hz, preferably about 50 Hz, so that the signal Sk for the light intensity accordingly varies likewise, specifically at twice the frequency of the alternating voltage, or in other words varies at a frequency of between about 40 Hz and 200 Hz, and preferably about 100 Hz. In the process, the light intensity reaches a maximum every 10 ms. The periodic variation in the light intensity of the light originating in artificial light sources thus makes it possible to distinguish it from the light intensity generated by the sun as a natural light source, and which as shown in FIG. 3 normally has irregular fluctuations.

By means of the evaluation device 32, the signals of the sensor device 20 are first evaluated for the presence of a periodically varying signal component. If such a periodically variable signal component is present, then the level of this signal component is ascertained, and if it exceeds a certain turn-on threshold value, then by means of the evaluation device 32, the lighting devices 10, 12 are either switched on, or if on are made to stay on. By means of the evaluation device 32, the level of the remaining, nonperiodically variable signal component can also be ascertained. By means of the evaluation device 32, a comparison of the level of the periodically variable signal component with the level of the remaining signal component can be done, and by means of the evaluation device 32 either the lighting devices 10, 12 are made to be turned on or to remain switched on, if the level of the periodically variable signal component is greater than the level of the remaining signal component. This assures that the lighting devices will be turned on or remain turned on if the intensity of the artificial light detected by the sensor device 20 is greater than the intensity of the natural light detected by the sensor device 20. Switching the lighting devices 10, 12 on, or keeping them in the switched-on state, is also effected whenever the signals of the sensor device 20 are above the basic turn-on threshold value and turn-off threshold value, as applicable.

If the sensor device 20 has the global sensor 22 and the directional sensor 29, then the above-explained evaluation for the presence of a periodically variable signal component is effected at least for the signals of the global sensor 22, or for the signals of both sensors 22, 29. The evaluation of the signals of the sensor device 20 is done in clocked fashion by the evaluation device 32, and the evaluation device 32 has an analog/digital converter, which uses a scanning frequency that is greater than the frequency of the periodically variable signal component of the sensor device 20. This assures that the periodically variable signal component of the sensor device 20 will be recognized by the evaluation device 32.

The foregoing relates to preferred exemplary embodiments of the invention, it being understood that other variants and embodiments thereof are possible within the spirit and scope of the invention, the latter being defined by the appended claims.

What is claimed is:

1. A system for automatic switching of lighting devices in vehicles, comprising a sensor device (20), by which the light intensity in the surroundings of the vehicle is detected and which is connected to an evaluation device (32), by which the signals (S) of the sensor device (20) for the light intensity are compared with at least one threshold value, and from this it is ascertained whether a change in the switching state of the lighting devices (10, 12) is necessary, said evaluation device (32) being operable to evaluate the signals (S) of the sensor device (20) for the presence of at least one periodically variable signal component (Sk), and in the presence of such a signal component (Sk), the lighting devices (10, 12) are switched on or remain switched on at a certain level, wherein the lighting devices (10, 12) are turned on or remain turned on by said evaluation device if the periodically variable signal component (Sk) is higher than the remaining, nonperiodically variable signal component.

2. The system of claim 1, wherein, by means of the evaluation device (32), the periodically variable signal component (Sk) with a frequency between 40 and 200 Hz, preferably with a frequency of about 100 Hz, is evaluated.

* * * * *